United States Patent [19]

Millard

[11] Patent Number: 4,785,573

[45] Date of Patent: Nov. 22, 1988

[54] PORTABLE ELECTRONIC INSECT CONTROLLER

[76] Inventor: Lance L. Millard, 2820 E. 36th Ct., Des Moines, Iowa 50317

[21] Appl. No.: 893,003

[22] Filed: Aug. 1, 1986

Related U.S. Application Data

[63] Continuation-in-part of Ser. No. 498,925, May 26, 1983, Pat. No. 4,603,505.

[51] Int. Cl.[4] .......................... A01M 1/22; A01M 1/04
[52] U.S. Cl. ....................................... 43/112; 43/113; 362/179; 431/253
[58] Field of Search ................... 43/112, 113; 431/253; 362/171–182, 312, 316

[56] References Cited

U.S. PATENT DOCUMENTS

| | | | |
|---|---|---|---|
| 1,962,420 | 6/1934 | Bradley | 43/112 |
| 2,061,458 | 11/1936 | Folmer | 43/112 |
| 2,263,659 | 11/1941 | Tullis | 362/179 |
| 2,881,554 | 4/1959 | Laine | 43/112 |
| 3,758,980 | 9/1973 | Bialobrzeski | 43/112 |
| 4,158,268 | 6/1979 | De Yoreo | 43/112 |
| 4,248,005 | 2/1981 | Hedstrom | 43/112 |

FOREIGN PATENT DOCUMENTS 2375823  9/1978  France .................................. 43/124

Primary Examiner—Gene P. Crosby
Attorney, Agent, or Firm—Zarley, McKee, Thomte, Voorhees & Sease

[57] ABSTRACT

A portable camping lantern includes an electrified grid including two half sections embracing the light unit and having indexing structure cooperating with a valve control on the lantern which functions to limit how the grid is placed on the lantern such that a safety interconnect extending from the grid to the battery below the capped refuel opening extends thereacross preventing the refueling of the lantern without disconnecting the power supply from the grid. Insect-attracting odor is sprayed across the grid upwardly from a manifold extending around the lantern and is carried by a carbon dioxide propellant. An insect-attracting sound-emitting unit is positioned closely adjacent to the grid for attracting insects to the grid. An appropriately colored glass enclosure extends around the lantern light to attract insects to the grid.

10 Claims, 3 Drawing Sheets

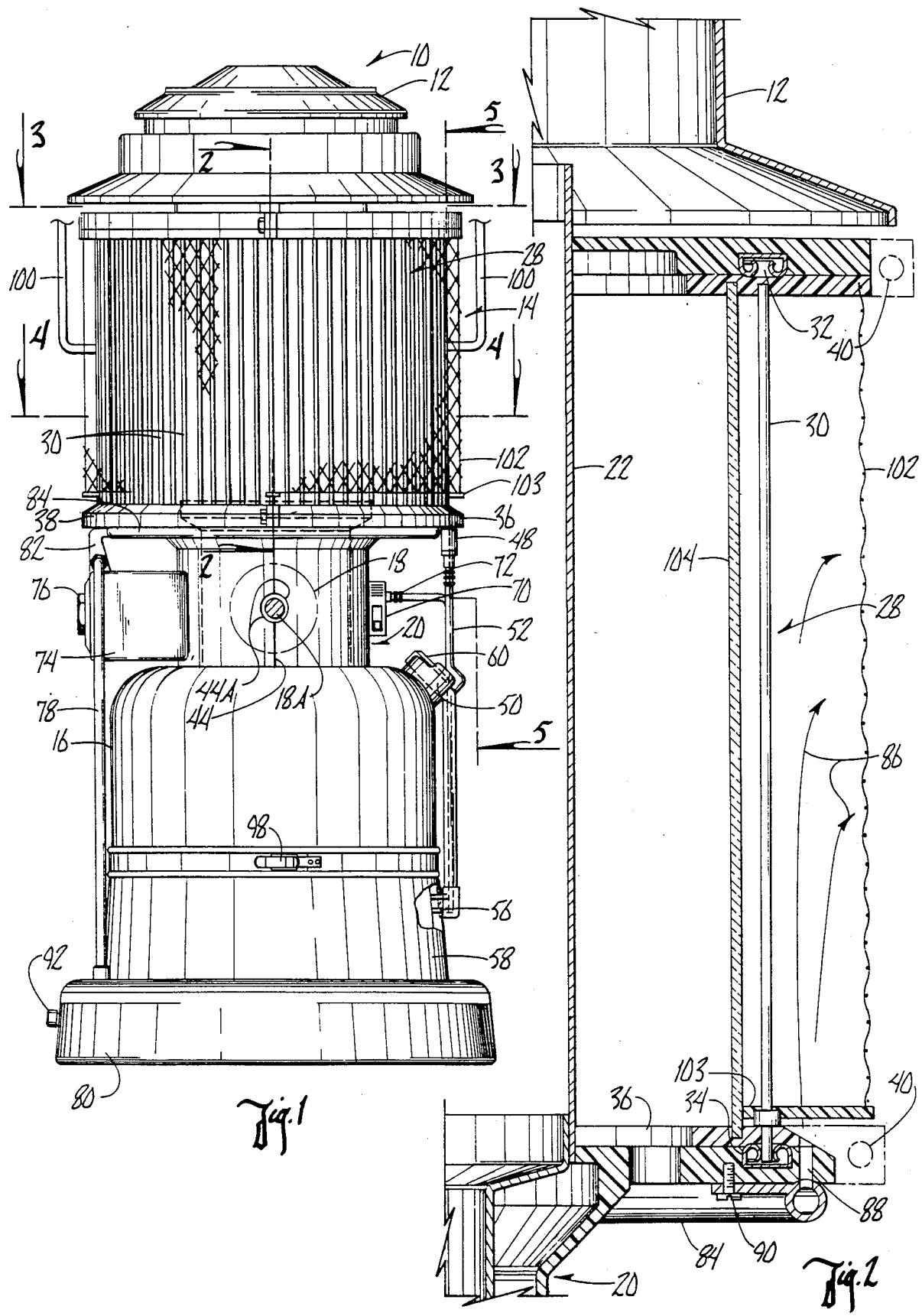

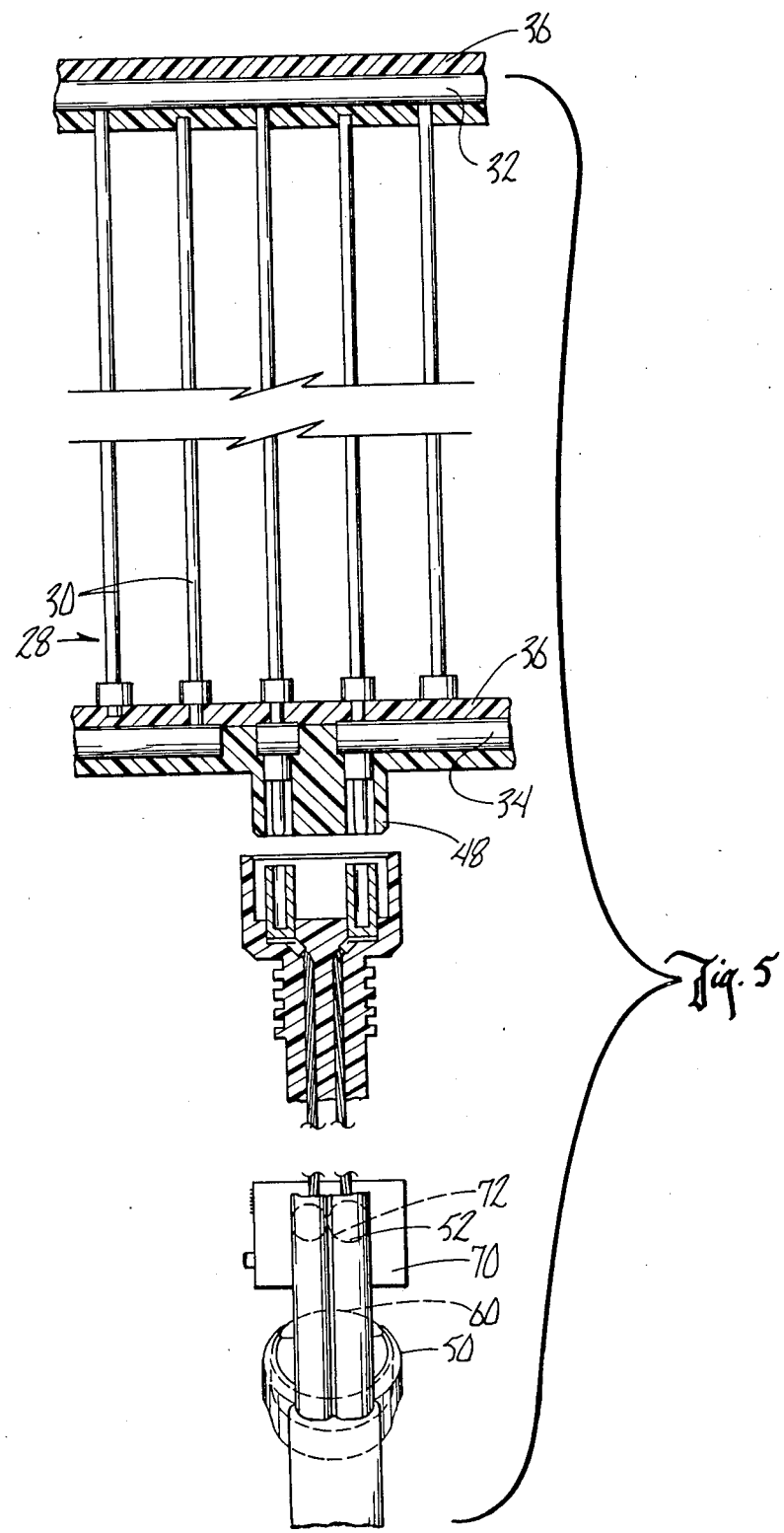

PORTABLE ELECTRONIC INSECT CONTROLLER

This is a continuation-in-part application of Ser. No. 498,925 filed May 26, 1983, PORTABLE ELECTRONIC INSECT CONTROLLER which issued as U.S. Pat. No. 4,603,505 Aug. 5, 1986.

BACKGROUND OF THE INVENTION

In my prior U.S. Pat. No. 4,603,505, I disclosed an electricfied grid around the lamp of a lantern and a safety interconnect was included in the electrical strap extending from the grid to the battery at the bottom of the lantern. The interconnect extended across the refuel opening and thus required disconnecting the battery from the grid to refuel the tank.

It is believed that additional features associated with this basis system will enhance its effectiveness in controlling insects and improve its ease of use by making it foolproof.

SUMMARY OF THE INVENTION

The electrified grid, when placed on the lantern, is foolproof in the sense that it can only be placed on the lantern in one position and in that position the electrical strap connecting the grid to the battery at the bottom of the lantern must extend across the capped-fill opening to the lantern tank. This is accomplished by providing a recess in each of the opposed edges of the grid half sections at their interface which matingly embrace the valve stem of the lantern. This positions the electrical elements on the grid directly above the fill opening on the lantern tank which in turn is directly above the electrical connectors on the battery stored at the bottom of the lantern.

A sound-emitting unit is also provided which attracts insects to the grid and is positined closely adjacent the grid. The glass lens enclosure around the lantern light is appropriately colored to attract the particular insects in the area to the grid.

A circular manifold is placed around the bottom of the grid for spraying an insect-attracting odor across the face of the grid. Carbon dioxide is used as a propellant for carrying the odor medium from a second container to the grid face.

BRIEF DESCRIPTION OF THE DRAWINGS

FIG. 1 is a fragmentary front elevational view.

FIG. 2 is a fragmentary cross-sectional view taken along line 2—2 in FIG. 1.

FIG. 5 is an enlarged exploded fragmentary view taken line 5—5 in FIG. 1.

DESCRIPTION OF THE PREFERRED EMBODIMENT

Figure 3:
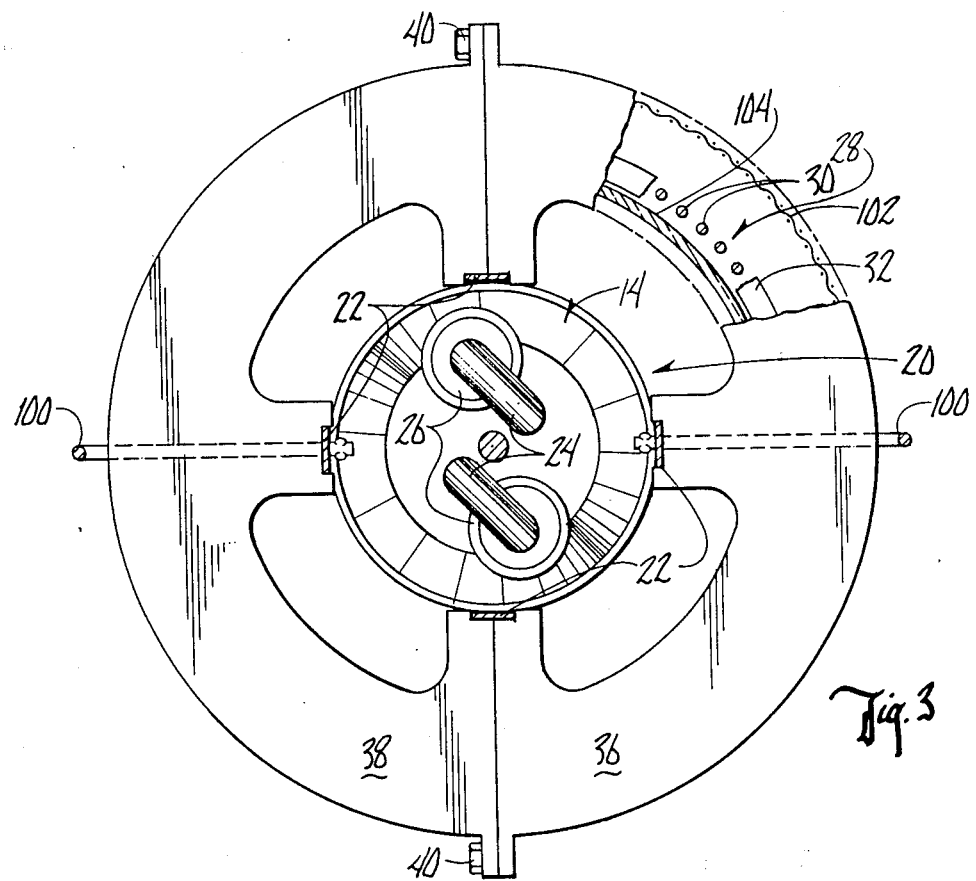
FIG. 3 is a cross-sectional view taken along line 3—3 in FIG. 1.

The lantern of this invention is referred to generally by the reference numeral 10 and includes an chimney 12 over a light-producing burner 14 positioned on a base fuel tank 16. A control valve 18 is provided on a throat midsection 20. The chimney unit 12 is connected to the throat midsection 20 by vertical frame members 22 positioned around the light burner unit 14. Fuel lines 24 feed burners 26 (FIG. 3).

Figure 4:
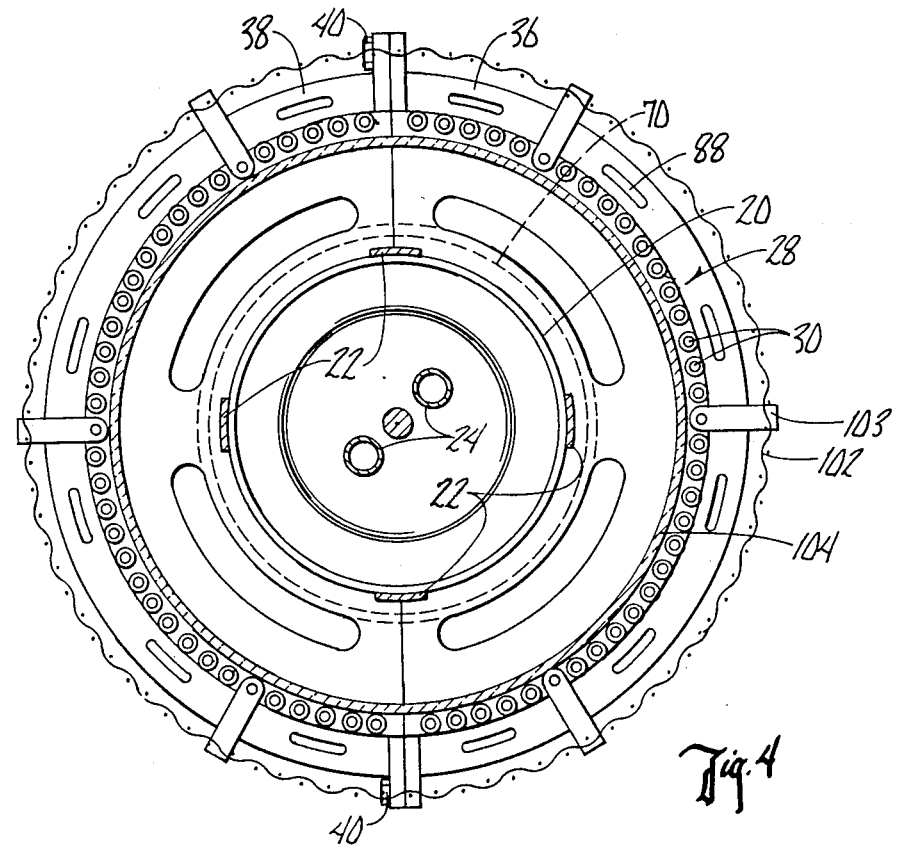
FIG. 4 is a cross-sectional view taken along line 4—4 in FIG. 1.

An electrified grid 28, as seen in FIG. 4, is circular in shape and encloses the light source 14 and includes grid bars 30 alternately extending from an electrical conductor 32 at the top and conductor 34 at the bottom. The grid includes two half sections 36 and 38 interconnected by bolts 40 at the top and bottom and on opposite sides. The half sections extend downwardly around the lantern to include midsection 20 and have opposed mating edges which extend around the shaft of the control valve 18, as seen in FIG. 1. The interface vertical plane 44 extends in a plane through the axial center of the valve shaft for the valve 18. A pair of female electrical elements 48 are positioned vertically above a fuel opening 50 on the tank 16 such that the electrical strap 52 must extend directly across the opening 50 to connect with electrical elements 56 extending out from the battery compartment 58 below the tank 16. The electrical strap 52 carries with it a cap 60 which is fitted over the cap of the fill opening 50. It is thus seen that the grid can only be placed on the lantern in such a way that the electrical strap 52 must extend in a straight line vertically across the refuel opening 50 to reach the battery electrodes 56 and the strap 52 has only sufficient length to extend this distance which is along a straight line. Thus it is seen that the valve stem 18A and the recesses 44A in the opposed edges of the half sections function as indexing means to locate the grid on the lantern.

An insect-attracting sound-emitting unit 70 is provided on the outside of the throat portion 20 of the half section 36, as seen in FIG. 1. An electrical connector 72 extends to the electrical strap 52 connecting (FIGS. 1 and 5) the grid to the battery. The sound unit is closely adjacent the grid such that insects attracted to it will necessarily come in contact with the grid.

An odor-dispensing system is provided for spraying odor across the face of the grid and includes an odor container 74 having a fill opening 76 and connected by a tube 78 to a carbon dioxide tank 80 on the bottom of the lantern and below the battery unit 58, as seen in FIG. 1. A tube 82 extends to a manifold 84 extending circumferentially around the base of the grid to spray odor, as indicated by the arrows 86 in FIG. 2 upwardly through peripherally spaced apart openings 88. The manifold 84 is connected to the bottom of the grid by screws 90. The carbon dioxide tank 80 may be filled through an opening 92.

The battery unit 58 and carbon dioxide chamber 80 are detachably connected to the bottom of the lantern at the bottom of the fuel tank 16 by a fastener 98. The lantern may be carried by a bail 100. A protective screen 102 extends around the grid outwardly thereof to prevent inadvertent human contact with the grid. The grid is supported by the laterally outwardly extending brace elements 103 connected to the grid bars 30, as seen in FIG. 4.

A glass enclosure 104 extends around the light-producing unit 14 closely adjacent to the grid bars 30, as seen in FIG. 2. The glass may be appropriately selected for its color to attract the desired insects in the area.

Thus it is seen in operation that a variety of options are provided for the operator. The light unit 14 of the lantern alone may be used to attract insects into contact with the electrified grid and/or the odor manifold 84 may be used to spray insect-attracting odor 86 across the face of the grid bars 30 to enhance the attraction of the insects to the grid. Another option is to turn on the sound unit 70 which will further enhance the magnetic quality of the lantern. The glass enclosure 104 may be appropriately selected in color to further enhance the insect attracting capability of the lantern to the grid. The unit is foolproof in that the grid half sections 36 and 38 cannot be mounted improperly on the lantern since the indexing feature requires that the half sections be mounted in only one way and that way positions the electrodes 48 in a direct line above the fill opening 50 into the fuel tank 16 which in turn is directly above the electrodes 56 on the battery unit 58.

What is claimed is:

1. A portable electronic insect controller, comprising,
   an electrified grid means in association with a light-producing camping lantern for electrocuting insects when they move within close proximity of the grid,
   a power supply means for supplying a controlled source of electrical energy to the grid,
   a safety interconnect means for electrically connecting the power supply means to the grid means and positioned to prevent the refueling of the lantern without disconnecting the grid from the power supply means, and
   cooperating indexing means on said grid means and said lantern to require said grid means when installed on said lantern, to be positioned on said lantern in only such a manner that said interconnect means is positioned to prevent refueling of the lantern without disconnecting the grid means from the power supply means.

2. The structure of claim 1 wherein said cooperating indexing means is further defined as a fixed lantern control valve and a mating opening on said grid means in which said valve is positioned.

3. The structure of claim 1 wherein said cooperating indexing means is further defined by said grid means as including two interconnected half sections embracing said lantern and said lantern having an outwardly extending member positioned at the interface of said two half sections thereby requiring said grid to be located on said lantern in only one position.

4. The structure of claim 3 wherein said outwardly extending member is further defined as the lanter control valve.

5. The structure of claim 4 wherein said half sections have apposed vertical edges at said interface and at least one of said edges includes a recess to receive said control valve.

6. The structure of claim 1 wherein said power supply means is located below a capped fuel refill opening, said interconnect means includes a separable strap electrically extending between said power supply and said grid means and being positioned in covering relation over said cap whereby said strap must be separated thereby opening a circuit including said power supply means and said grid means before said cap can be removed from said refill opening to permit refueling of said lantern.

7. The structure of claim 6 wherein the length of said strap is only sufficient to extend directly between said power supply and grid means across said capped fuel refill opening thereby requiring said strap to extend across said fuel refill opening.

8. A portable electronic insect controller, comprising,
   an electrified grid means in association with a light-producing camping lantern for electrocuting insects when they move within close proximity of the grid,
   a power supply means for supplying a controlled source of electrical energy to the grid, and
   an insect-attracting odor-emitting unit on said lantern in close proximity to said electrified grid means to attract insects into said grid for the purpose of insect elimination.

9. The structure of claim 8 wherein said odor-emitting unit is positioned to direct odors across said electrified grid.

10. The structure of claim 9 wherein said odor-emitting unit is further defined as including a manifold positioned to emit odors upwardly uniformly across the peripheral surface of said grid.

* * * * *